United States Patent
Cobb (10) Patent No.: US 6,809,873 B2
(45) Date of Patent: Oct. 26, 2004

(54) COLOR ILLUMINATION SYSTEM FOR SPATIAL LIGHT MODULATORS USING MULTIPLE DOUBLE TELECENTRIC RELAYS

(75) Inventor: Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 10 days.

(21) Appl. No.: 10/237,516

(22) Filed: Sep. 9, 2002

(65) Prior Publication Data

US 2004/0047045 A1 Mar. 11, 2004

(51) Int. Cl.⁷ .......................... G02B 27/14; G03B 21/00
(52) U.S. Cl. .......................... 359/634; 359/629; 353/31
(58) Field of Search ................. 359/618, 623, 359/627, 629, 634, 636, 663; 353/31–33, 34, 81

(56) References Cited

U.S. PATENT DOCUMENTS

| | | |
|---|---|---|
| 3,202,039 A | 8/1965 | DeLang et al. |
| 4,441,791 A | 4/1984 | Hornbeck |
| 4,836,649 A | 6/1989 | Ledebuhr et al. |
| 5,098,183 A | 3/1992 | Sonehara |
| 5,345,262 A | 9/1994 | Yee et al. |
| 5,374,968 A | 12/1994 | Haven et al. |
| 5,535,047 A | 7/1996 | Hornbeck |
| 5,597,222 A | 1/1997 | Doany et al. |
| 5,600,383 A | 2/1997 | Hornbeck |
| 5,621,486 A | 4/1997 | Doany et al. |
| 5,719,695 A | 2/1998 | Heimbuch |
| 5,777,789 A * | 7/1998 | Chiu et al. ............... 353/33 |
| 5,798,819 A | 8/1998 | Hattori et al. |
| 5,808,795 A | 9/1998 | Shimomura et al. |
| 5,907,437 A | 5/1999 | Sprotbery et al. |
| 5,914,818 A | 6/1999 | Tejada et al. |
| 5,918,961 A | 7/1999 | Ueda |
| 5,930,050 A | 7/1999 | Dewald |
| 5,944,401 A | 8/1999 | Murakami et al. |
| 6,005,722 A * | 12/1999 | Butterworth et al. ....... 359/618 |
| 6,008,951 A | 12/1999 | Anderson |
| 6,010,121 A | 1/2000 | Lee |
| 6,019,474 A | 2/2000 | Doany et al. |
| 6,053,615 A | 4/2000 | Peterson et al. |
| 6,062,694 A | 5/2000 | Oikawa et al. |
| 6,089,717 A | 7/2000 | Iwai |
| 6,113,239 A | 9/2000 | Sampsell et al. |
| 6,122,103 A | 9/2000 | Perkins et al. |
| 6,141,151 A | 10/2000 | Shimonura et al. |
| 6,172,813 B1 | 1/2001 | Tadic-Galeb et al. |
| 6,220,713 B1 | 4/2001 | Tadic-Galeb et al. |
| 6,231,192 B1 | 5/2001 | Konno et al. |

(List continued on next page.)

FOREIGN PATENT DOCUMENTS

WO 02/01885 A1 1/2002

OTHER PUBLICATIONS

S. Arnold; "An Improved Polarizing Beamsplitter LCOS Projection Display Based on Wire–Grid Polarizers"; SID 01 Digest, pp. 1282–1285, Jun. 2001.

M. Hahn and C. Huck; "Digitale Projektoren Einsatz als Videodisplays"; vol. 55, No. 1/2, Jan. 2001, pp. 36–43.

*Primary Examiner*—Georgia Epps
*Assistant Examiner*—Alicia M. Harrington
(74) *Attorney, Agent, or Firm*—Nelson Adrian Blish (57) ABSTRACT

A digital projection apparatus (10) for projection of a multicolor image uniformizes polychromatic light from a light source (12) and provides magnification to the uniformized illumination beam using a base condenser relay (80), providing a reduced numerical aperture for conditioning at a dichroic separator (27). For each monochromatic component color provided from the dichroic separator (27), a reducing relay (82) then demagnifies the illumination beam to provide source illumination to a spatial light modulator (30) at an increased numerical aperture. As a result, color shading across the field is minimized and brightness is optimized.

6 Claims, 7 Drawing Sheets

U.S. PATENT DOCUMENTS

| | | |
|---|---|---|
| 6,247,816 B1 | 6/2001 | Cipolla et al. |
| 6,254,237 B1 | 7/2001 | Booth |
| 6,262,851 B1 | 7/2001 | Marshall |
| 6,280,035 B1 | 8/2001 | Tadic-Galeb et al. |
| 6,429,906 B1 * | 8/2002 | Sekine et al. ................. 353/34 |
| 2002/0005916 A1 | 1/2002 | Sawai et al. |
| 2002/0171809 A1 * | 11/2002 | Kurtz et al. .................. 353/31 |
| 2003/0202159 A1 * | 10/2003 | Cobb et al. ................... 353/31 |

* cited by examiner

FIG. 1

(PRIOR ART)

COLOR ILLUMINATION SYSTEM FOR SPATIAL LIGHT MODULATORS USING MULTIPLE DOUBLE TELECENTRIC RELAYS

CROSS REFERENCE TO RELATED APPLICATIONS

Reference is made to commonly-assigned U.S. patent application Ser. No. 09/813,207 now U.S. Pat. No. 6,585,378, filed Mar. 20, 2001 entitled DIGITAL CINEMA PROJECTOR by Kurtz et al.; U.S. patent application Ser. No. 10/050,309, filed Jan. 16, 2002, entitled PROJECTION APPARATUS USING SPATIAL LIGHT MODULATOR, by Joshua M. Cobb; and U.S. patent application Ser. No. 10/131,871 now U.S. Pat. No. 6,676,260, filed Apr. 25, 2002, entitled PROJECTION APPARATUS USING SPATIAL LIGHT MODULATOR WITH RELAY LENS AND DICHROIC COMBINER, by Cobb et al., the disclosures of which are incorporated herein.

FIELD OF THE INVENTION

This invention generally relates to a projection apparatus that forms a color image from digital data using a spatial light modulator and more particularly relates to an illumination system for providing, from a white light source, color illumination having high intensity, high efficiency, and sharply defined spectral edges.

BACKGROUND OF THE INVENTION

In order to be considered as suitable replacements for conventional film projectors, digital projection systems must meet demanding requirements for image quality. This is particularly true for multicolor cinematic projection systems. In order to provide a competitive alternative to conventional cinematic-quality projectors, digital projection apparatus must meet high standards of performance, providing high resolution, wide color gamut, high brightness, and frame-sequential contrast ratios exceeding 1,000:1.

The most promising solutions for multicolor digital cinema projection employ, as image forming devices, one of two basic types of spatial light modulators. The first type of spatial light modulator is the digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951 (Anderson); and U.S. Pat. No. 6,089,717 (Iwai). DMDs have been employed in digital projection systems. However, although DMD-based projectors demonstrate some capability to provide the necessary light throughput, contrast ratio, and color gamut, inherent resolution limitations (with current devices providing only 1024×768 pixels) and high component and system costs have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. LCDs appear to have advantages as spatial light modulators for high-quality digital cinema projection systems. These advantages include relatively large device size and favorable device yields. Among examples of electronic projection apparatus that utilize LCD spatial light modulators are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,121 (Maki et al.); and U.S. Pat. No. 6,062,694 (Oikawa et al.).

In an electronic projection apparatus using spatial light modulators, individual colors, conventionally red, green, and blue (RGB), are separately modulated in a corresponding red, green, or blue portion of the optical path. The modulated light of each color is then combined in order to form a composite, multicolor RGB color image. There are two basic approaches for projection optics that combine the modulated color light. The first approach, which can be characterized as a convergent approach, is adapted from earlier, conventional projection systems. Using the convergent approach, the component red, green, and blue light have separate axes which are converged by projection optics that effectively bend each light path as necessary in order to form a composite, multicolor color image at some focal plane. As an illustrative example, U.S. Pat. No. 5,345,262 (Yee et al.) discloses a convergent video projection system. Significantly, the disclosure of U.S. Pat. No. 5,345,262 illustrates one of the major problems with the convergent projection approach: namely, that the separate color images must be properly registered on the projection surface. Misregistration or poor focus along any one of the color light projection paths can easily result in an unsatisfactory image. It is instructive to observe that, using this approach, the image paths are converged only at the focus plane.

U.S. Pat. No. 5,907,437 (Sprotbery et al.) discloses an attempt to simplify design complexity and alleviate some of the light path alignment and registration problems inherent to multicolor projection systems using the convergent approach described above. In the U.S. Pat. No. 5,907,437 disclosure, a light valve projection system is described in which a converging optical system converges the red, green, and blue modulated light paths in order to form a converged image, advantageously centered on the axis of a projection lens. The design strategy outlined in U.S. Pat. No. 5,907,437 thus simplifies the projection lens design task for a system using the convergent approach. However, other problems inherent to a convergent approach remain.

One notable problem with approaches similar to that disclosed in U.S. Pat. No. 5,907,437 is a relatively high etendue. As is well known in the optical arts, etendue relates to the amount of light that can be handled by an optical system. Potentially, the larger the etendue, the brighter the image. Numerically, etendue is proportional to the product of two factors, namely the image area and the numerical aperture. Increasing the numerical aperture, for example, increases etendue so that the optical system captures more light. Similarly, increasing the source image size, so that light originates over a larger area, increases etendue and, therefore, brightness. As a general rule, increased etendue results in a more complex and costly optical design. Using an approach such as that outlined in U.S. Pat. No. 5,907,437, for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in U.S. Pat. No. 5,907,437, optical components handle a sizable image area, therefore a high etendue, since red, green, and blue color paths are separate and must be optically converged. Moreover, although the configuration disclosed in U.S. Pat. No. 5,907,437 handles light from three times the area of the final multicolor image formed, this configuration does not afford any benefit of increased brightness, since each color path contains only one-third of the total light level. In particular, the second relay lens and the projection lens of a convergent optics system such as that disclosed in U.S. Pat. No. 5,907,437 are inherently constrained by a large etendue, which adds cost and complexity to such a solution. Moreover, the second relay lens must be color corrected over the full visible spectrum. At the same time, different segments of the relay lens and of the projection lens handle different wavelengths, so that localized lens imperfections, dust, or dirt not only affect the projected image, but can impact the color quality. In light, then, of etendue constraints, of color correction requirements, of dust and dirt sensitivity, and of the need for, maximizing brightness levels for digital projection, there appear to be significant inherent limitations that hamper the convergent approach exemplified in U.S. Pat. No. 5,907,437.

Figure 1:
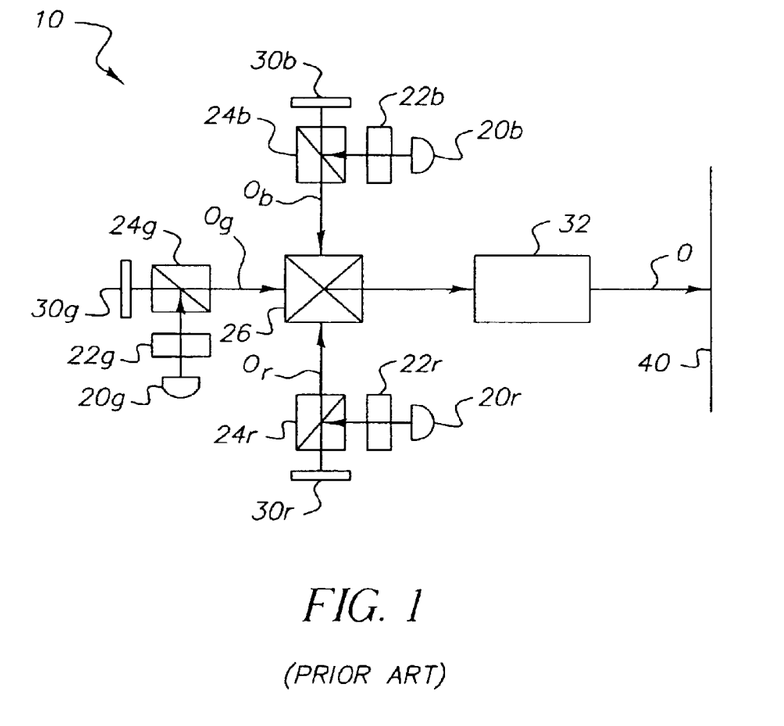
FIG. 1 is a schematic block diagram showing major components of a conventional, prior art digital projection apparatus.

An alternative approach to projection optics can be characterized as a coaxial approach. In contrast to the convergent approach in which component red, green and blue light beams are bent to converge at a focal plane, the coaxial approach combines the component red, green, and blue modulated light beams along a common axis. In order to do this, the coaxial approach employs a dichroic combining element, such as an X-cube or Philips prism. X-cubes or X-prisms and related dichroic optical elements, such as those disclosed in U.S. Pat. No. 5,098,183 (Sonehara) and U.S. Pat. No. 6,019,474 (Doany et al.) are well known in the optical imaging arts. The dichroic combining element combines modulated light from each color path and folds the color paths together along a common axis in order to provide the combined color image to a projection lens. Referring to FIG. 1, there is shown a simplified block diagram of a conventional digital projection system 10 using the coaxial approach. Each color path (r=red, g=green, b=blue) uses similar components for forming a modulated light beam. Individual components within each path are labeled with an appended r, g, or b, appropriately. For the description that follows, however, distinctions between color paths are specified only when necessary. Following any of the three color paths, a light source 20 provides unmodulated light, which is conditioned by uniformizing optics 22 to provide a uniform illumination. A polarizing beamsplitter 24 directs light having the appropriate polarization state to a spatial light modulator 30 which selectively modulates the polarization state of the incident light over an array of pixel sites. The action of spatial light modulator 30 forms an image. The modulated light from this image, transmitted along an optical axis $O_r$, $O_g$, $O_b$ through polarizing beamsplitter 24, is directed to a dichroic combiner 26, typically an X-cube, Philips prism, or combination of dichroic surfaces in conventional systems. Dichroic combiner 26 combines the red, green, and blue modulated images from separate optical axes $O_r$, $O_g$, $O_b$ to form a combined, multicolor image for a projection lens 32 along a common optical axis O for projection onto a display surface 40, such as a projection screen.

In contrast to the convergent approach outlined above with reference to U.S. Pat. No. 5,907,437, the coaxial approach, as shown in the block diagram of FIG. 1 and as exemplified in U.S. Pat. No. 5,808,795 (Shimomura et al.) has a number of advantages. With respect to light throughput, the coaxial approach, because it combines light paths along a common axis, does not increase the etendue of the optical system. Instead, with respect to projection lens 32, dichroic combiner 26, by folding the appropriate optical axes $O_r$ and $O_b$ to join with optical axis $O_g$ and form a common optical axis O, optically overlaps the areas of spatial light modulators 30r, 30g, 30b. Thus, the etendue has no increase whether one, two, three, or more spatial light modulators are combined in this way. And since each light color is separately modulated, then combined and provided to projection lens 32 along a common optical axis O, no optical system is required between dichroic combiner 26 and projection lens 32.

A Philips prism, such as that disclosed in U.S. Pat. No. 3,202,039 (DeLang et al.) could alternately be employed as dichroic combiner 26. Familiar to those skilled in the digital image projection arts, Philips prisms have been employed as chromatic separator or combiner components in projector designs such as those disclosed in U.S. Pat. Nos. 6,280,035 and 6,172,813 (both to Tadic-Galeb et al.), U.S. Pat. No. 6,262,851 (Marshall), and U.S. Pat. No. 5,621,486 (Doany et al.), for example.

While digital projection systems 10 designed using the basic model of FIG. 1 are able to provide good levels of image quality, there is felt to be room for improvement. Constraints imposed by dichroic coatings are a key consideration. Dichroic coatings used for dichroic combiner 26 can be expensive and difficult to design and fabricate for suitable performance with incident light over a wide range of angles, particularly in projection applications where high brightness levels and a broad color gamut are needed. Dichroic coatings reflect and transmit light as a function of incident angle and wavelength. As the incident angle varies, the wavelength of light that is transmitted or reflected also changes. Where a dichroic coating is used with an optical system having a low f/#, a broad spectrum will be reflected or transmitted by the coating, due to the wide range of incident angles.

Figure 2A:
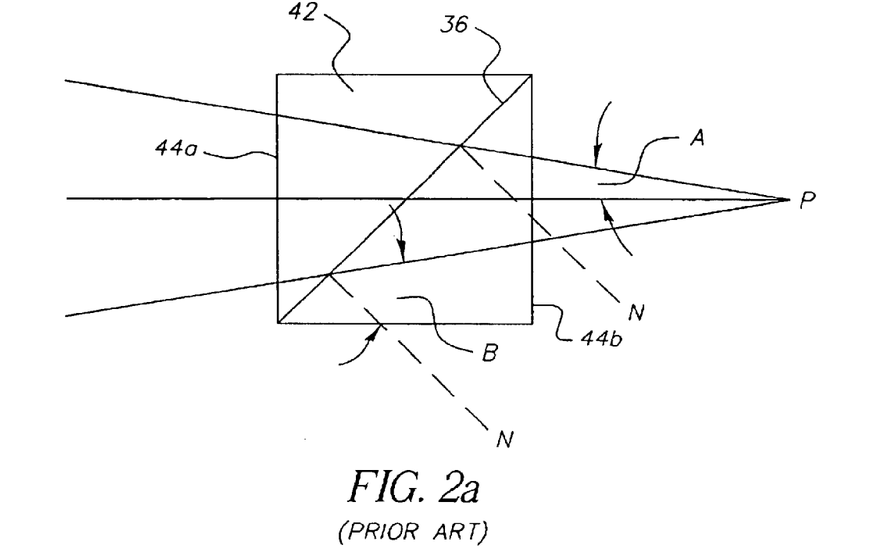
FIGS. 2a and 2b are ray diagrams showing incidence of light upon a dichroic coating at two different f/# values.
Figure 2B:
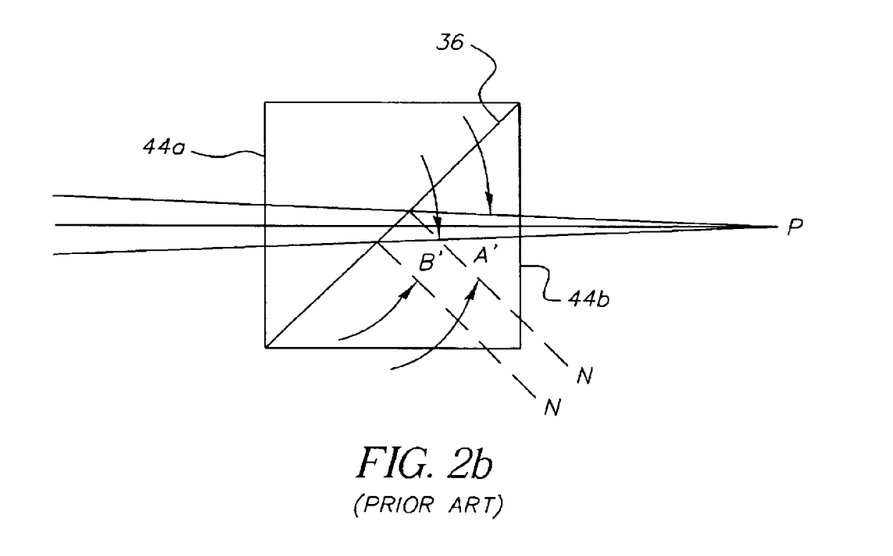

FIGS. 2a and 2b illustrate the change in the performance of a dichroic coating as the range of incident light angles increases. Referring to FIGS. 2a and 2b, there is represented a light cone from a point source P and incident to a dichroic surface 36, which is disposed at a diagonal in these Figures. FIGS. 2a and 2b represent light incident to a dichroic surface 36 at two different f/# values. In FIG. 2a, the light cone, having a smaller f/#, is incident to dichroic surface 36 at a larger range of angles. Incident angles are considered with respect to a normal N to dichroic surface 36. Because of the difference between angle A at one extreme of the incident light beam and angle B at the opposite extreme, dichroic surface 36 will cause a color shift to occur across the transmitted and reflected light cones.

By comparison, the light cone is incident at a larger f/# in FIG. 2b. Here, there is very little difference between angles A' and B' at extreme edges of the incident light cone. In such a case, dichroic surface 36 response will cause correspondingly less color shift across the transmitted and reflected light cones than with the smaller f/# shown in FIG. 2a.

As is clear from FIGS. 2a and 2b, dichroic surface 36 has some support structure, typically a prism 42. For minimizing aberrations, the flatness of surfaces 44a and 44b is of more importance with the smaller f/# of FIG. 2a where the light cone presents a wider angular range, than with the larger f/# of FIG. 2b where the light cone presents a smaller angular range. Thus, if a larger f/# light cone can be used, surface tolerance requirements of prism 42 in a dichroic combiner can be relaxed, thereby reducing cost and alignment complexity. However, conventionally, a light cone having a smaller f/# is used in projection systems, since system designs are directed to maximizing brightness.

Figure 2C:
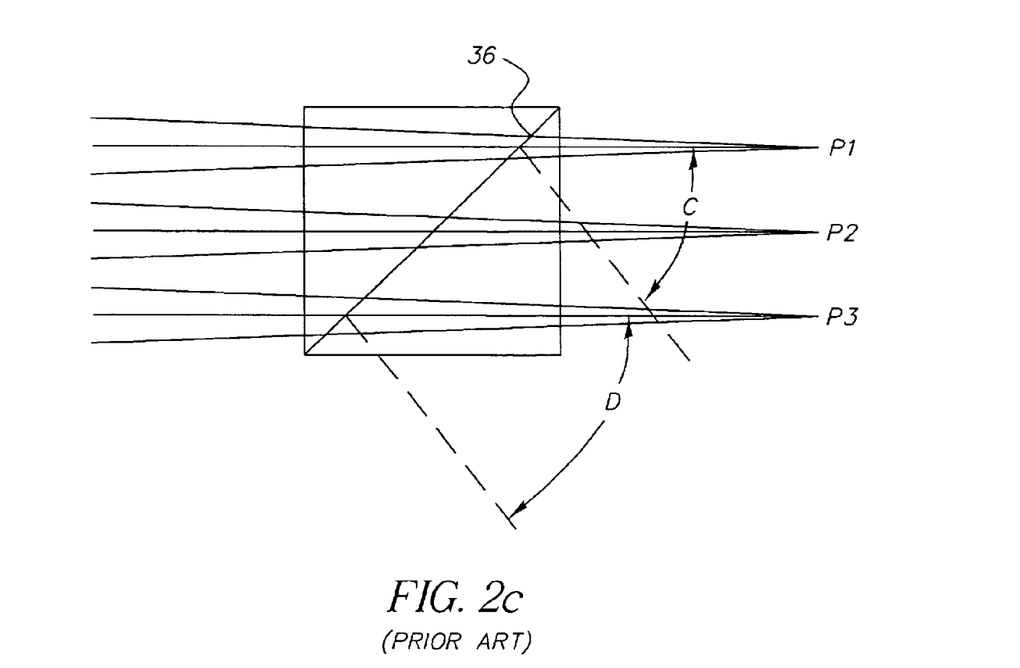
FIGS. 2c and 2d are ray diagrams showing non-telecentric and telecentric light incident upon a dichroic coating.
Figure 2D:
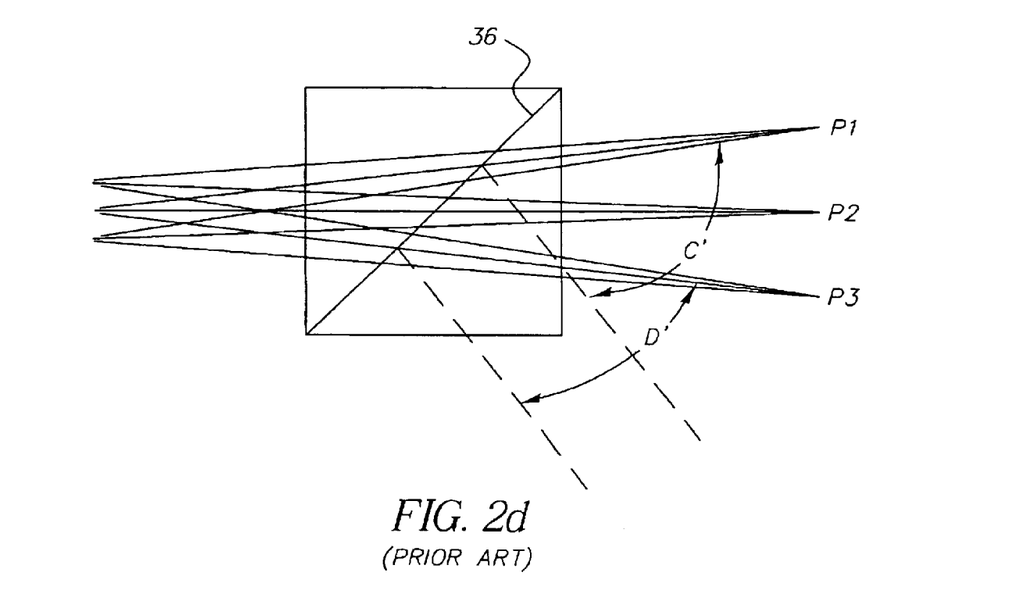

Related to the benefits of higher f/# illustrated in FIGS. 2a and 2b are the benefits of telecentricity illustrated by comparing FIGS. 2c and 2d. Here, point sources P1, P2, and P3 represent points on a flat image plane, with rays incident on dichroic surface 36. In FIG. 2c, light cones from point sources P1, P2, and P3 are telecentric and corresponding angles C and D are identical. By comparison, in FIG. 2d, the light cones are not telecentric and corresponding angles C' and D' differ. This difference in incident angles can cause light from point source P1 to have a slightly different color than light from point source P3, thereby producing a color shift over the field.

From FIGS. 2a–2d, it can be seen that there are advantages in providing telecentric light at a small range of incidence angles (that is, at high f/#). However, in practice, it has been shown to be difficult to obtain these advantages for digital projection apparatus, due to the need to maintain high brightness levels at the same time.

As is well known in the imaging arts, in order to maximize color gamut, each composite color should have a narrow spectral range, to provide as pure a saturated color as possible. For example, it would be difficult to produce a deep red color using a red light channel that also includes some green light. Thus, where a low f/# is used with a color-combining prism or other optical element, the broad spectral response of the dichroic coating reduces the color gamut. At the same time, however, a low f/#, because it collects more light at a wider angular range, is desirable for obtaining high brightness levels. While there are conventional corrective techniques for improving color gamut, such as filtering, these techniques can reduce brightness. The limitations of coatings within dichroic combiner 26, then, constrain the capability of projection system 10 optics to optimize both brightness level and color gamut.

Figure 3A:
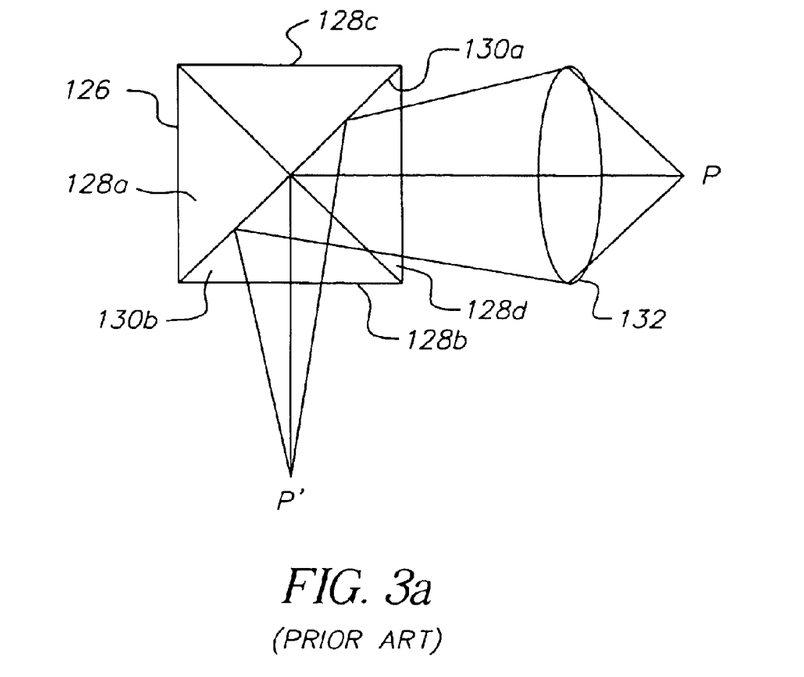
FIG. 3a shows the imaging response of an idealized X-cube.
Figure 3B:
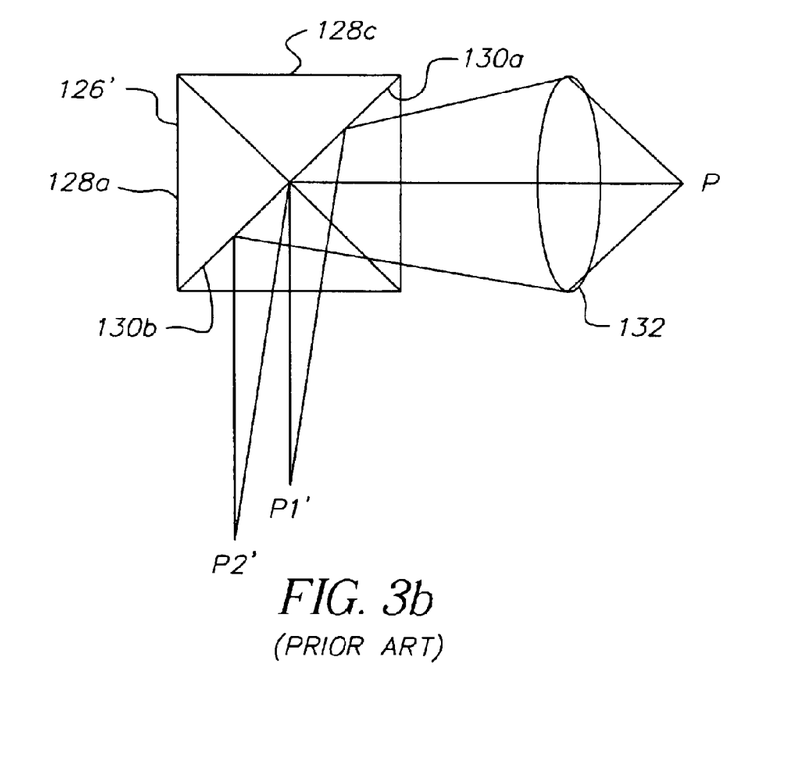
FIG. 3b shows the imaging response of an X-cube having slight misalignment errors.

FIG. 3a illustrates the response of an idealized X-cube 126 to light directed through a lens 132 from a light source P. X-cube 126 comprises four prisms 128a, 128b, 128c, and 128d, having appropriate surface treatments and cemented together. Surfaces 130a and 130b are treated to reflect light from P having the proper wavelength. Surfaces 130a and 130b must be perfectly planar and perfectly aligned with respect to one another to provide aberration-free reflection in order to form an image at point P'. In contrast with FIG. 3a, FIG. 3b shows the response of X-cube 126' in which surfaces 130a and 130b are not perfectly aligned. The misalignment of surfaces 130a and 130b causes light from point source P to form two separate images at points P1' and P2'. Aberration effects, such as the visible seam noted above, would be most noticeable when the distance between image points P1' and P2' is on the order of one pixel width or larger. Clearly, blur in an image that is reflected through X-cube 126' would be increasingly more pronounced with increasing distance, in any direction, between image points P1' and P2'. Correspondingly, the smaller the pixel dimensions, the greater the impact of an aberration due to imperfections in fabrication of X-cube 126'

Limitations of the familiar X-cube dichroic combiner 26 are inherent in the manufacture of the device itself. The X-cube is assembled from four prisms, with the internal surfaces of each prism having appropriate dichroic coatings. In fabrication, prisms are glued together, with inner surface planes aligned as closely as possible. However, even slight tolerance errors in X-cube fabrication can result in imaging problems when these devices are used with conventional digital projection solutions. For example, slight misalignment of the planar coated surfaces within the X-cube could cause aberrations such as color fringing. Color fringing aberrations can be corrected up to a point; however, there would be an advantages to a dichroic combiner design that was less prone to problems of this type. The "seam" at which dichroic surfaces are combined tends to appear as one or more lines in the displayed image. Fabrication of a high-quality X-cube is further complicated by the requirement that individual component prisms have identical refractive indices; in practice, this is best accomplished when the same glass melt is used for all prism components. In addition, coating processes must be uniform on multiple prism surfaces. Optical coatings applied to X-cube surfaces typically have sub-micron thickness and are multi-layered, sometimes requiring as many as 50 or 60 layers. Thus, careful parts tracking must be carried out in addition to precision fabrication practices. Further problems are a result of the difficulties in providing uniform, flat surfaces on outer faces of the assembled X-cube. It can be well appreciated that this complexity adds considerable cost to the X-cube. Finally, obtaining brightness using conventional approaches results in high heat levels, which can damage adhesives and coating surfaces of the X-cube.

It can be readily appreciated that, in practice, fabrication of a perfect X-cube 126 as in FIG. 3a would be very difficult and some tolerance for error must be allowed. For this reason, it is advantageous, when designing an optical system using an X-cube 126, to minimize dependence on maintaining precise X-cube 126 tolerances.

Of related importance for imaging quality is preserving telecentricity wherever possible in the optical system. When cones of light from two different point source locations on the surface of spatial light modulator 30 are not telecentric, these different locations then present different incident angles to dichroic surfaces in dichroic combiner 26. In response, dichroic combiner 26 reflects different wavelength bands at different field positions, resulting in color shifts across the image. It is well known in the optical design arts that telecentric imaging at spatial light modulator 30 helps to further reduce contrast shading across the image.

As another well known principle in design of projection apparatus, it is beneficial to minimize the retrofocus distance of projection lens 32, thus minimizing the back working distance requirements and cost of projection lens 32. It would be preferable to avoid the cost and complexity requirements of a projection lens having a long back focal length relative to its effective focal length, such as the solution disclosed in U.S. Pat. No. 6,008,951 (Anderson), for example.

U.S. Pat. No. 6,113,239 (Sampsell et al.) discloses an arrangement of projection display components with a hybrid X-cube design that incrementally reduces the back working distance requirement for a projection lens. In this disclosure, both polarizing beamsplitters and dichroic combining surfaces are combined in a single X-cube, shortening the projection lens working distance when compared with other prior art designs. Notably, however, improved brightness is not achieved by the design in U.S. Pat. No. 6,113,239, since the angular constraints of dichroic surfaces have not been alleviated. Other problems include costly coatings solutions, since polarizing beamsplitter coatings are not readily optimized for all color and polarization combinations. Moreover, further improvement in the working distance requirements would be beneficial.

U.S. Pat. No. 5,944,401 (Murakami et al.) discloses, as an alternative to X-cube dichroics, an optical block comprising dichroic surfaces within plastic prisms. This solution provides some relief for back working distance requirements, since the refractive index of plastics exceeds that of air. To minimize back working distance, transmissive spatial light modulators are employed, allowing image-formation as close to the combining optical block as possible. However, this arrangement would not be well-suited for projector apparatus using reflective spatial light modulators, since back working distance requirements are still excessive. In terms of back working distance, the solution of U.S. Pat. No. 5,944,401 is not advantaged over conventional X-cube designs. A sizable projection lens would be required for full-scale cinema projection. Moreover, the solution disclosed in U.S. Pat. No. 5,944,401 does not address the inherent angular limitations of dichroic surfaces described above. Thus, brightness levels are constrained with this type of design solution.

U.S. Pat. No. 5,597,222 (Doany et al.) discloses, for use in a digital projector, an optical relay lens system that alleviates some of the difficulties noted above that relate to inherent tolerance problems and projection lens working requirements. U.S. Pat. No. 5,597,222 discloses the use of a single 1x, double-telecentric relay lens to relay the combined image from individual RGB color paths to a MacNeille polarizing beamsplitter. In U.S. Pat. No. 5,597,222, spatial light modulators are disposed very near a dichroic combiner X-cube, to minimize thereby some of the potential adverse effects of imperfections in outer surface flatness and tolerance errors in inner surface fabrication. However, this solution falls far short of what is needed to compensate for inherent problems with X-cube coatings and surfaces so that both image brightness and color gamut can be maintained. For example, the design noted in U.S. Pat. No. 5,597,222 fails to address inherent angular dependencies in the dichroic coating response, so that it remains difficult to support a large color gamut while maintaining image brightness at the same time. Moreover, the projection lens must also use a high numerical aperture with this design, which implies added cost over designs with lower numerical aperture. Because of the scale of spatial light modulator components, the design of U.S. Pat. No. 5,597,222 is still very dependent on high-quality X-cube design. Further, the arrangement disclosed in U.S. Pat. No. 5,597,222 employs a relatively large number of optical components between a polarizing beamsplitter and its modulating LCD. With a large number of optical components in the path of a polarized illumination source, some unavoidable stress birefringence would necessarily alter the polarization states of both unmodulated and modulated light traveling in both directions, resulting in loss of image contrast.

U.S. Pat. No. 6,247,816 (Cipolla et al.) discloses use of a 1x relay lens for relaying an intermediate image towards a dichroic combiner in only one of the color paths. The solution in U.S. Pat. No. 6,247,816 addresses a component packaging problem, but does not alleviate any of the angular constraints imposed by dichroic combiner response. Neither does the solution in U.S. Pat. No. 6,247,816 provide any relief with respect to back working distance requirements of the projection lens.

U.S. Pat. No. 4,836,649 (Ledebuhr et al.) discloses a 1x relay lens arrangement used in the illumination path to minimize the size of polarization components and in the modulated light path to help alleviate back working distance constraints for a digital projection system. While this arrangement provides some advantages, color-combining dichroic surfaces must still handle light at low f/# values, resulting in reduced color gamut. Moreover, the projection lens must also operate at a low f/# when using this solution.

As is stressed in the disclosure of U.S. Pat. No. 5,374,968 (Haven et al.) the conventional approach for maximizing brightness in projection systems emphasizes low f/# optics. However, as is noted above with reference to FIGS. 2a–2d, the performance of dichroic surfaces used for combining color image paths is hindered by the large incidence angles of low f/# optical systems.

In spite of their high cost and known problems, X-cubes have served as dichroic combiners in a substantial number of imaging device designs. One reason for the widespread use of X-cubes and similar devices relates to their compact size when compared against other solutions using dichroic surfaces. In order to minimize back working distance of the projection lens, conventional design approaches position spatial light modulators closely to the X-cube, as was shown in U.S. Pat. No. 6,113,239, for example.

Strategies for eliminating the X-cube include those disclosed in U.S. Pat. No. 6,231,192 (Konno et al.) Here, dichroic mirrors are employed for combining the light from each color modulation path, with equal optical distances maintained in each light path. The system described provides a less costly solution than conventional solutions using X-cube optics. At the same time, however, the solution disclosed in U.S. Pat. No. 6,231,192 does not alleviate the back working requirements of the projection lens system. This solution limits the f/# of projector optics to slower speeds, constraining the available brightness and requiring larger projection lens diameters. Correction for astigmatism must be provided by cylindrical optics in the projection path.

Figure 6:
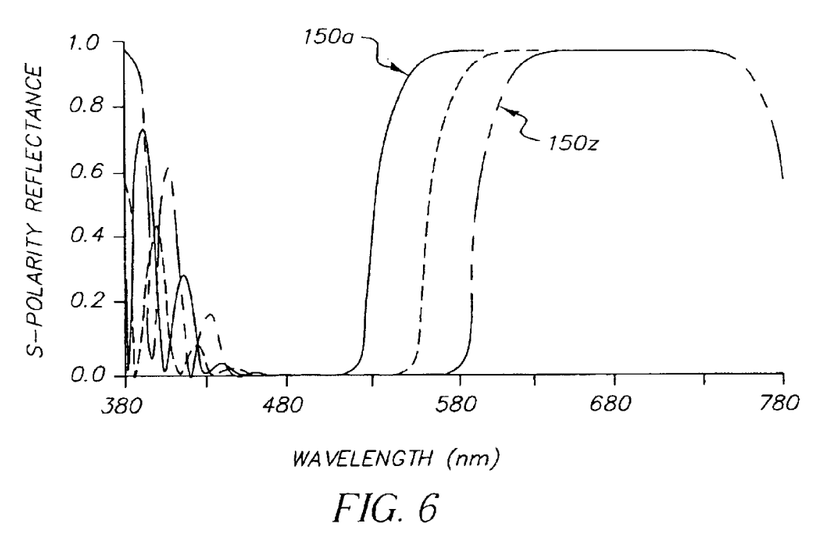
FIG. 6 is a graph showing s-polarity reflectance versus wavelength for a range of incident angles.

Dichroic components, including X-cubes, Philips prisms, and related structures that use dichroic surfaces, are also used in the illumination light path, conventionally employed to separate white light into red, green, and blue light components for modulation. U.S. Pat. No. 6,053,615 (Peterson et al.), U.S. Pat. No. 6,220,713 (Tadic-Galeb et al.), and U.S. Pat. No. 6,254,237 (Booth) are just a few examples of projector designs using dichroic components for color separation. As can be expected, the same performance problems related to light incident angle apply whether dichroic coatings are used to combine modulated light into the projection path or are used to separate unmodulated light in the illumination path. When dichroic surfaces receive incident light at varying angles, output performance is affected, causing perceptible color shifts across the field. It is difficult to correct for this slight color shading; graduated filters are expensive to design and reduce the overall brightness available. With respect to color accuracy, optimum results are obtained when dichroic surfaces handle incident light at relatively low incident angles. This provides the best filter response characteristics, allowing minimal leakage of unwanted color in each color channel. Referring to FIG. 6, there is shown a typical reflectance response, by wavelength, for a dichroic surface. The set of curves show the successive variation in response for the same dichroic surface as the incident angle changes over a range. At the extremes of this range of incident angles, curves 150a and 150z show how dramatically this response can be altered. Here, the response curve changes its reflectance characteristics with incident angle, so that with the incident angle at one extreme the primary transition occurs near 520 nm, as shown by curve 150a, and at the other extreme the primary transition occurs just above 620 nm, as shown by curve 150z. Since incident light will vary over some range, there can easily be some leakage of green light into the red channel, for example. Thus, it can be appreciated that limiting the range of incident angles handled by a dichroic surface will provide the best color performance. It is also instructive to compare the steeper slope of curve 150a with the less steep slope of curve 150z. As a general rule, the steeper the slope of the response curve for a dichroic surface, the better the spectral characteristics, that is, the less leakage of unwanted wavelengths. Sharply defined spectral edges are desirable for obtaining the best color response from a dichroic surface.

One solution for maximizing brightness and reducing the overall incident angles at color combiner dichroic surfaces is to increase the size of the uniform light area and effectively lower the numerical aperture of the uniformized light area that is incident on dichroic separator surfaces. However, this would be difficult to achieve without increasing the bulk and cost of uniformizing components. Further problems present themselves. For example, where an integrating bar is used as a light uniformizer, it would not be sufficient merely to make the integrating bar larger in cross-section. In order for sufficient homogenizing of the light, the integrating bar would also need to be longer, adding size, weight, and cost. Similar problems limit solutions using other types of uniformizing components. Such solutions are made more difficult by the need to maximize light at the spatial light modulator itself, providing incident light at a high numerical aperture.

In summary, conventional approaches to digital projector design make some compromises relative to performance, cost, and complexity in order to provide a high quality image with maximum brightness. The illumination optics can be constrained from providing high levels of brightness and spectral purity when using dichroic separators with conventional design approaches. Thus, it can be seen that there is a need for improvement in illumination optics for digital projection that alleviates the inherent angular limitations of dichroic coatings while providing maximum brightness and color gamut.

SUMMARY OF THE INVENTION

It is an object of the present invention to provide an illumination optical system for providing high brightness, high efficiency, and sharply defined spectral edges when using dichroic surfaces in a digital projection system. With this object in mind, the present invention provides a projection apparatus for projecting a multicolor image onto a display surface, the apparatus comprising:
- (a) a polychromatic light source;
- (b) uniformizing means for homogenizing light from the polychromatic light source to provide a uniform illumination field;
- (c) a base condenser relay lens for magnifying the uniform illumination field to form a magnified uniform illumination field and for directing the magnified uniform illumination field toward a dichroic separator, the dichroic separator providing colored light for a first, second, and third colored light channel;
- (d) a first reducing relay lens for imaging and directing the colored light in the first colored light channel towards a first spatial light modulator for forming a first modulated light beam;
- (e) a second reducing relay lens for imaging and directing said colored light in the second colored light channel towards a second spatial light modulator for forming a second modulated light beam;
- (f) a third reducing relay lens for imaging and directing the colored light in the third colored light channel towards a third spatial light modulator for forming a third modulated light beam;
- (g) a color combiner for combining the first, second, and third modulated light beams to form a multicolor modulated light beam; and
- (h) a projection lens for projecting the multicolor modulated light beam onto the display surface.

It is a feature of the present invention that it provides a magnifying base condenser relay lens that is double-telecentric, to magnify the image of the uniform plane formed by the uniformizing means and provide this image as input illumination for a color separator. Each reducing relay lens is also double-telecentric, thereby maintaining the uniformity of illumination in the projection apparatus.

By magnifying the image of a uniform field, the magnifying base condenser relay lens effectively allows the dichroic separator to operate at a higher f/#, receiving a narrower range of incident angles, thus decreasing color shift across the angular field that is incident on the dichroic surface. This creates a more sharply defined spectral edge for each color channel and thus improves the efficiency of the illumination system.

It is an advantage of the present invention that, because it relays light to the dichroic separator at a lower f/#, it allows use of less expensive dichroic coatings on separator components.

It is a further advantage of the present invention that it favorably changes the numerical aperture at key points within the illumination system. At the uniformizing component itself, a high numerical aperture is best. By magnifying the image of the uniform area, the present invention then provides the image to the dichroic separator at a reduced numerical aperture, which is most favorable. Then, at the spatial light modulator itself, demagnification provides a higher numerical aperture, needed for obtaining the maximum brightness.

It is a further advantage of the present invention that it reduces the size and weight requirements for integrator components.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The goal of the present invention is to provide illumination optics for a color projection system where brightness is maximized and color shading effects due to dichroic surface angular response are minimized.

Figure 4:
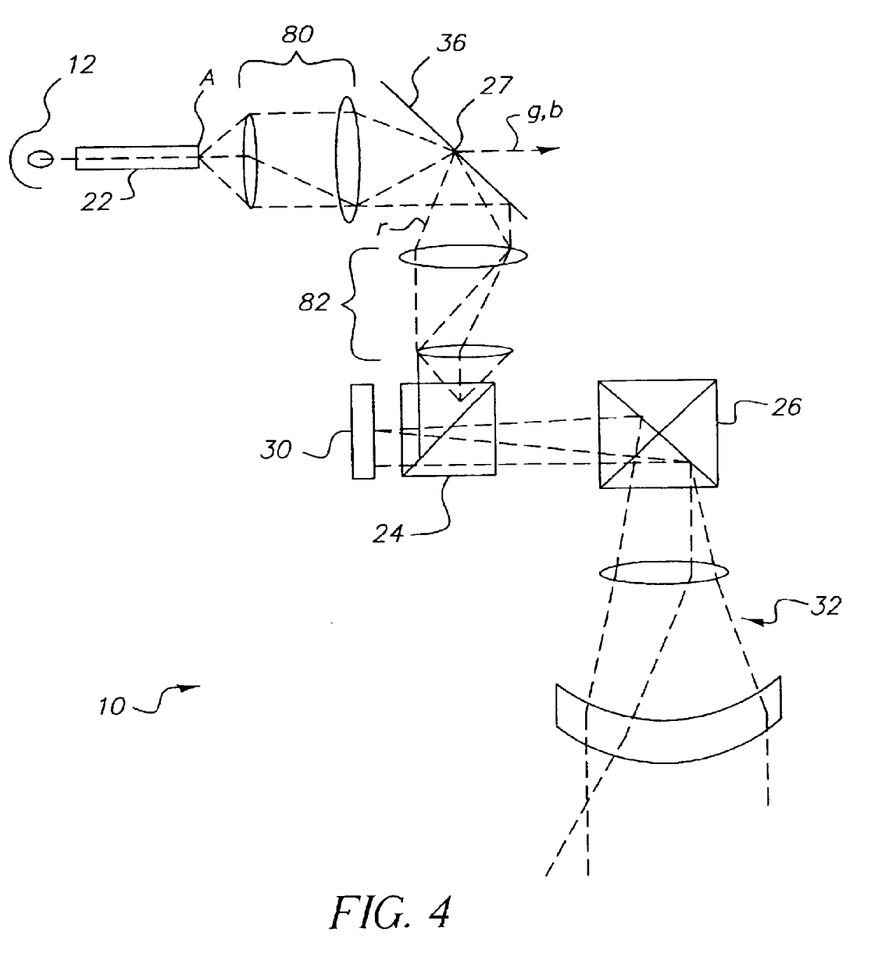
FIG. 4 is a schematic view showing key components in the illumination and imaging path.

Referring to FIG. 4, there is shown, in schematic form, an implementation of components used in the red optical path of projection apparatus 10 in the present invention. A polychromatic light source 12 directs source illumination through uniformizing optics 22. Light source 12 is typically a lamp, such as a Xenon arc lamp, but could also be some other type of high-intensity light emitter. In a preferred embodiment, an integrating bar serves as uniformizing optics 22. Well-known in the optical design art, integrating bars, also termed light-mixing bars, use total internal reflection (TIR) effects to homogenize incident light, thereby providing a spatially uniform plane of illumination. Other options for uniformizing optics 22 include a lenslet array, such as a fly's eye array, or a diffusing screen, an integrating tunnel, fiber optic faceplate, or glass. Uniformizing optics 22 provides a uniform plane of light at its output A, which effectively serves as an internal image of light source 12. A telecentric base condenser relay 80 images this output, magnifying the image at output A and directing the light toward dichroic surface 36 in a dichroic separator 27. Referring again to FIG. 4, only the red light path is illustrated; the remaining blue and green light, transmitted through dichroic surface 36 illuminate separate modulation paths in a similar manner, using techniques well known in the color imaging arts. In this way, there is formed an enlarged internal image of output A for each red, green, and blue color path.

A reducing relay 82 then demagnifies the colored light output from dichroic separator 27 and directs the light toward spatial light modulator 30, effectively providing a color reduced internal image of output A at spatial light modulator 30. There is a separate reducing relay 82 in each color light path. In the preferred embodiment of FIG. 4, spatial light modulator 30 is a reflective LCD, requiring polarizing beamsplitter 24. Polarizing beamsplitter 24 could be a conventional McNeille beamsplitter or a wire-grid beamsplitter, such as those available from Moxtek Inc. of Orem, Utah or described in U.S. Pat. No. 6,122,103, for example. Dichroic combiner 26 then combines the modulated light from each light path to form a polychromatic modulated light image for projection by projection lens 32. For other types of spatial light modulator, polarizing beamsplitter 24 would not be necessary. Where a DMD device or transmissive LCD is employed as spatial light modulator 30, light from reducing relay 82 goes directly to spatial light modulator 30. Where a DMD is used as spatial light modulator 30 appropriate adaptations would be made to the imaging optics path, such as substitution of a total internal reflection (TIR) beamsplitter for polarizing beamsplitter 24, as is well known in the digital projection art.

As described in the background material given above, projection apparatus 10 provides a high level of performance by maximizing brightness and by minimizing color shading and related aberrations. Using conventional design approaches, however, dichroic surface 36 constrains brightness. Increasing the brightness of available light in the system comes at the expense of allowing higher incident light angles at dichroic surface 36. The resulting color shift across the field degrades color performance and degrades the overall efficiency of the system. The arrangement of FIG. 4 overcomes this problem by conditioning the angle of incident light at key points in the system. First, maximum uniformity is achieved where uniformizing optics 22 operate with a low f/#. With the configuration of FIG. 4, uniformizing optics 22, an integrating bar in a preferred embodiment, is at approximately f/1.31. This low f/# allows the light traveling through the integrating bar to have multiple bounces through the bar and also allows integrating bar dimensions to be minimized. However, this also means that uniformized light emerges at high incident angles, which are not favorable at dichroic separator 27. At the same time, the size of the surface at output A of uniformizing optics 22 is small relative to the size of the imaging surface of spatial light modulator 30. In order to correct for these angular and size disadvantages, base condenser relay 80 provides approximately 3.5× magnification to the uniformized output of uniformizing optics 22. This magnification effectively provides incident light to dichroic separator 27 at f/4.6, well within the acceptable range for conventional dichroic surface 36. The magnified image of output A is, however, now too large relative to the surface of spatial light modulator 30. Reducing relay 82, therefore, provides 0.5× magnification. This not only reduces the image size of uniformizing optics 22 output, but also increases the incidence angle of the illumination provided to spatial light modulator 30, delivering illumination at approximately f/2.3, which is within a desirable range for most LCD and other spatial light modulators 30. Thus, by magnifying and demagnifying the uniformized illumination output at key points, the apparatus of the present invention optimizes brightness and minimizes color degradation that would otherwise be caused by high incident angles at dichroic separator 27. It must be emphasized that each color light modulation path (for example, red, green, and blue) has a separate reducing relay 82. This arrangement allows reducing relay 82 to be designed for best performance over a specific range of wavelengths.

Figure 5:
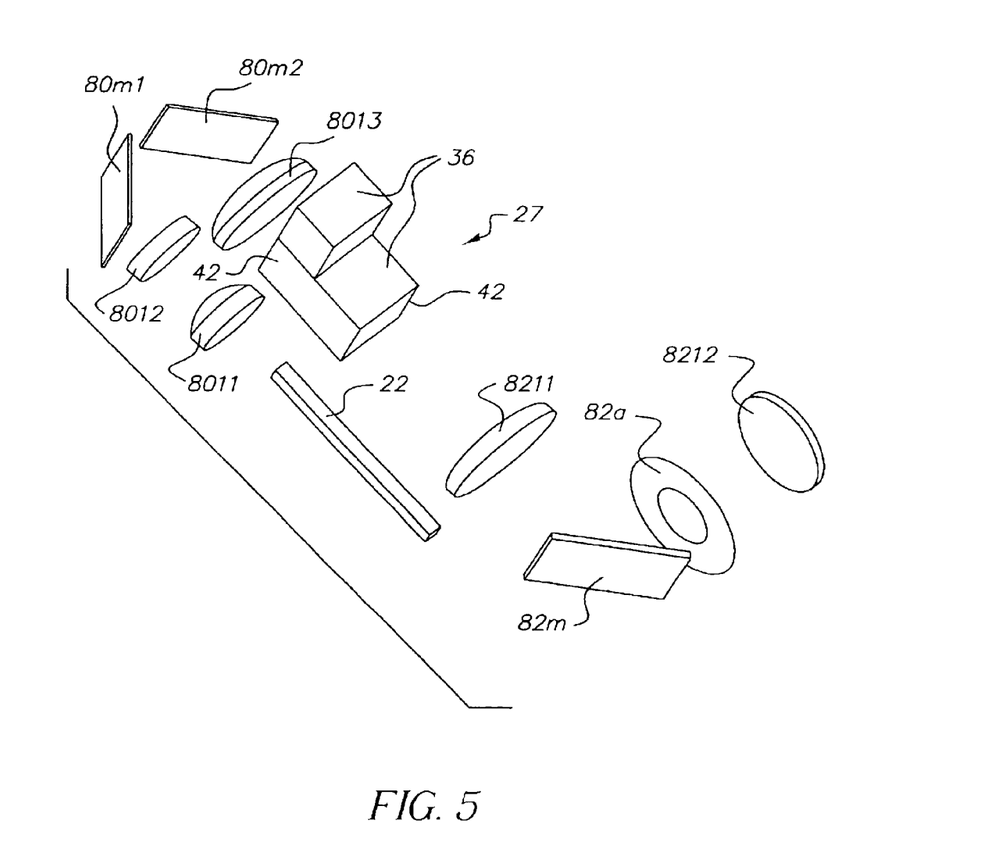
FIG. 5 is a perspective view showing one possible arrangement of illumination optics using the present invention.

Referring to FIG. 5, there is shown a perspective view of key components of base condenser relay 80 and reducing relay 82 in a preferred embodiment. In this configuration, base condenser 80 consists of lenses 80/1, 80/2, and 80/3. Two mirrors 80m1 and 80m2 fold the light path and direct light to dichroic separator 27. Here, dichroic separator 27 has inner dichroic surfaces 36 within transparent prisms 42.

Reducing relay 82 consists of two lenses 82/1 and 82/2 with a folding mirror 82m and an aperture 82a. Reducing relay 82 is also double-telecentric, which helps to minimize color shifts due to angular response characteristics of dichroic separator 27 and to minimize contrast loss due to the angular response of spatial light modulator 30.

Dichroic separator 27 could also be an X-cube or X-prism, a Philips prism, or an arrangement of dichroic surfaces 36 that provide a color splitting function.

With these improvements, then, the present invention boosts the imaging performance of projection apparatus 10 and allows simpler, more compact optical design at minimal cost.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the amount of magnification provided by base condenser relay 80 can be any value greater than 1x, and should be suitably matched to the dimensions and characteristics of uniformizing optics 22 and of other components in the imaging path. Not shown or described in detail are a number of additional supporting polarization components conventionally used to improve contrast and performance of LCD spatial light modulators 30. A polarizer (not shown) could be deployed between uniformizing optics 22 and base condenser relay 80 or, optionally, in each color path before or after reducing relay 82. The present invention allows the use of any suitable type of illumination system for providing source colored light for modulation by spatial light modulators 30. Light source 12 could include various types of lamps, filters, LEDs, lasers or other illumination components. More than three color light modulation paths can be provided.

Thus, what is provided is an improved projection apparatus and method for digital image projection with an illumination system for providing, from a white light source, color illumination having high intensity, high efficiency, and sharply defined spectral edges.

PARTS LIST

10 Projection apparatus
12 Light source
20 Light source
20*r* Light source, red
20*g* Light source, green
20*b* Light source, blue
22 Uniformizing optics
22*r* Uniformizing optics, red
22*g* Uniformizing optics, green
22*b* Uniformizing optics, blue
24 Polarizing beamsplitter
24*r* Polarizing beamsplitter, red
24*g* Polarizing beamsplitter, green
24*b* Polarizing beamsplitter, blue
26 Dichroic combiner
27 Dichroic separator
30 Spatial light modulator
30*r* Spatial light modulator, red
30*g* Spatial light modulator, green
30*b* Spatial light modulator, blue
32 Projection lens
36 Dichroic surface
40 Display surface
42 Prism
44*a* Surface
44*b* Surface
80 Base condenser relay
80*l*1 Lens
80*l*2 Lens
80*l*3 Lens
80*m*1 Mirror
80*m*2 Mirror
82 Reducing relay
82*a* Aperture
82*l*1 Lens
82*l*2 Lens
82*m* Mirror
126 X-cube
126' X-cube
128*a* Prism
128*b* Prism
128*c* Prism
128*d* Prism
130*a* Surface
130*b* Surface
132 Lens
150*a* Curve
150*z* Curve

What is claimed is:

1. A projection apparatus for projecting a color image onto a display surface, the apparatus comprising:
    (a) a polychromatic light source;
    (b) uniformizing means for homogenizing light from said polychromatic light source to provide a uniform illumination field;
    (c) a base condenser relay lens for magnifying said uniform illumination field to form a magnified uniform illumination field;
    (d) color splitting means for splitting said magnified uniform illumination field into a first color channel for forming a magnified first color illumination field and into at least a second single-color channel for forming a magnified second color illumination field;
    (e) a first reducing relay lens for forming a reduced first color illumination field from said magnified first color illumination field and for directing said reduced first color illumination field towards a first spatial light modulator for forming a first modulated light beam;
    (f) color combining means for directing said first modulated light beam toward a projection lens for projection toward the display and
    (g) a second reducing relay lens for forming a reduced second color illumination field from said magnified second color illumination field and for directing said reduced second color illumination field towards a second spatial light modulator for forming a second modulated light beam, said second modulated light beam directed to said color combining means.

2. A method for projecting a multicolor image toward a display surface, the method comprising:
    (a) providing a uniform illumination field of polychromatic light as an internal image;
    (b) magnifying said internal image towards a dichroic color separator to obtain, as images of said internal image, a first enlarged color internal image, a second enlarged color internal image, and a third enlarged color internal image;
    (c) demagnifying said first enlarged color internal image to form a first reduced color internal image for modulation at a first spatial light modulator to provide a first color modulated image;
    (d) demagnifying said second enlarged color internal image to form a second reduced color internal image for modulation at a second spatial light modulator to provide a second color modulated image;
    (e) demagnifying said third enlarged color internal image to form a third reduced color internal image for modulation at a third spatial light modulator to provide a third color modulated image; and
    (f) combining said first, second, and third color modulated images onto a single axis to form the multicolor image and projecting the multicolor image toward the display surface.

3. A method for projecting a multicolor image according to claim 2 wherein the step of magnifying said internal image comprises the step of directing said internal image through a telecentric base condenser lens.

4. A method for projecting a multicolor image according to claim 2 wherein the step of demagnifying said first enlarged color internal image comprises the step of directing said first enlarged color internal image through a telecentric lens.

5. A method for projecting a multicolor image toward a display surface, the method comprising:
- (a) magnifying a uniform illumination beam directed toward a color separator to obtain a low effective numerical aperture for said uniform illumination beam, thereby providing a first, second, and third monochromatic uniform illumination beam;
- (b) demagnifying said first monochromatic uniform illumination beam directed toward a first spatial light modulator to obtain a high effective numerical aperture at said first spatial light modulator and modulating said first monochromatic uniform illumination beam to form a first color image beam;
- (c) demagnifying said second monochromatic uniform illumination beam directed toward a second spatial light modulator to obtain a high effective numerical aperture at said second spatial light modulator and modulating said second monochromatic uniform illumination beam to form a second color image beam;
- (d) demagnifying said third monochromatic uniform illumination beam directed toward a third spatial light modulator to obtain a high effective numerical aperture at said third spatial light modulator and modulating said third monochromatic uniform illumination beam to form a third color image beam; and
- (e) combining said first, second, and third color image beams to form a multicolor image beam and projecting said multicolor image beam toward the display surface.

6. A projection apparatus for projecting a color image onto a display surface, the apparatus comprising:
- (a) a polychromatic light source;
- (b) uniformizing means for homogenizing light from said polychromatic light source to provide a uniform illumination field;
- (c) a base condenser relay lens for magnifying said uniform illumination field to form a magnified uniform illumination field;
- (d) color splitting means for splitting said magnified uniform illumination field into a first color channel for forming a magnified first color illumination field and into at least a second single-color channel for forming a magnified second color illumination field;
- (e) a first reducing relay lens for forming a reduced first color illumination field from said magnified first color illumination field and for directing said reduced first color illumination field towards a first spatial light modulator for forming a first modulated light beam;
- (f) color combining means for directing said first modulated light beam toward a projection lens for projection toward the display surface; and
- (g) a second reducing relay lens for forming a reduced second color illumination field from said magnified second color illumination field and for directing said reduced second color illumination field towards a second spatial light modulator for forming a second modulated light beam, said second modulated light beam directed to said color combining means.

* * * * *